UNITED STATES PATENT OFFICE.

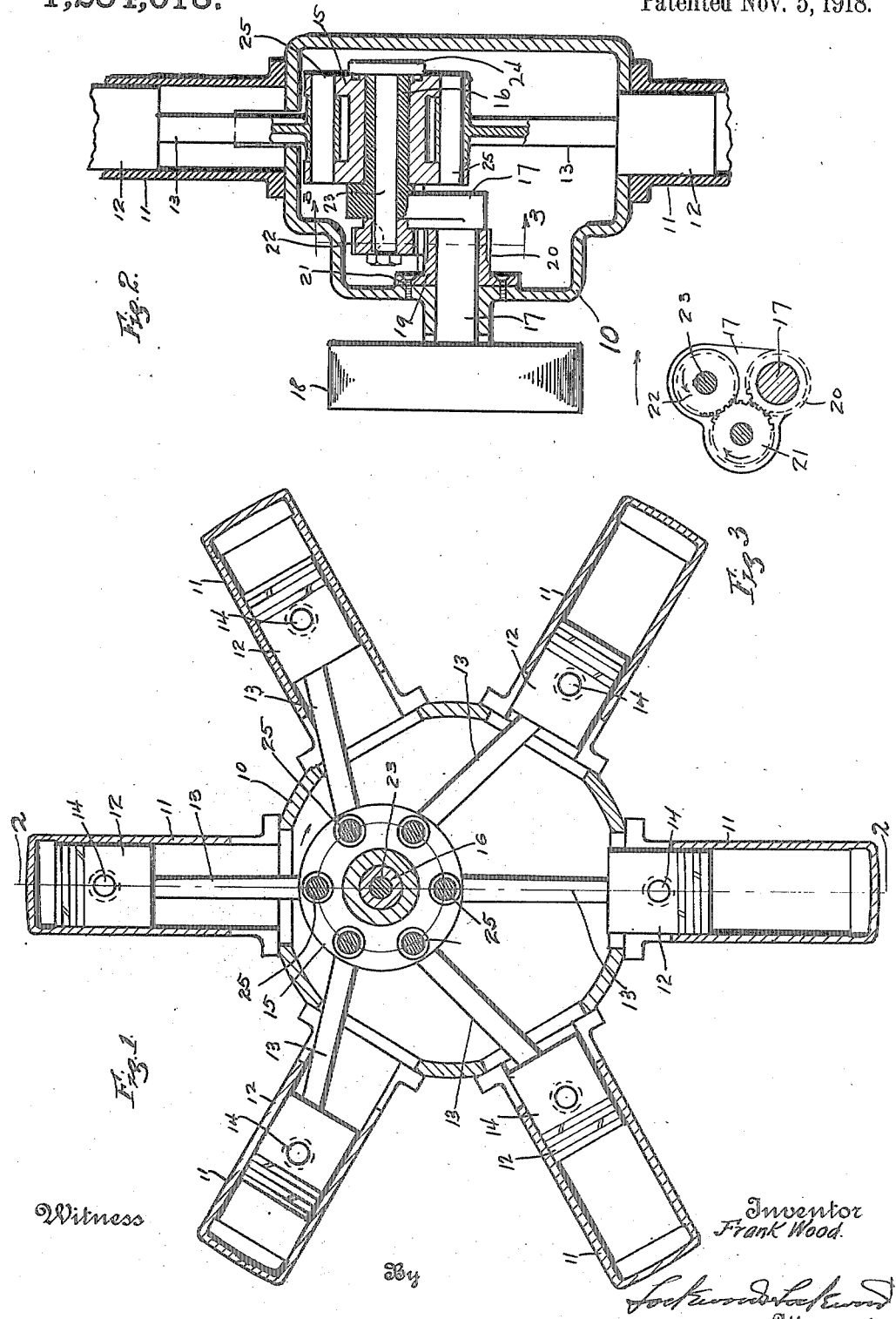

FRANK WOOD, OF MOUNT COMFORT, INDIANA.

ROTARY BEARING FOR INTERNAL-COMBUSTION ENGINES.

1,284,018.             Specification of Letters Patent.      Patented Nov. 5, 1918.

Application filed April 27, 1917. Serial No. 164,871.

*To all whom it may concern:*

Be it known that I, FRANK WOOD, a citizen of the United States, and a resident of Mount Comfort, county of Hancock and State of Indiana, have invented a certain new and useful Rotary Bearing for Internal-Combustion Engines; and I do hereby declare that the following is a full, clear, and exact description thereof, reference being had to the accompanying drawings, in which like letters refer to like parts.

This invention relates to a rotary bearing for an internal combustion engine of the type having radially extending cylinders surrounding the periphery of the crank case.

The main features of this invention is to provide a connecting rod bearing mounted on the crank shaft which will retain its same relative position to the cylinders at all times during the rotary movement of its center. In other words, the diametric lines of the bearing and of the crank case will at all times remain relatively constant. This action of the bearing stabilizes the pistons and connecting rods so that they operate in perfect alinement. This is accomplished by means of a set of gears mounted in connection with the crank shaft and the bearings as will be hereinafter more fully described. Therefore, by this means the angular position of the bearing on the crank shaft is always the same.

The full nature of the invention will be understood from the accompanying drawings and the following description and claims.

Figure 1 is a central vertical cross section through an internal combustion engine showing the connection between the pistons and bearings. Fig. 2 is a cross section taken on the line 2—2 of Fig. 1. Fig. 3 is a cross section taken on the line 3—3 of Fig. 2, showing the crank shaft and gear.

In the drawings there is shown an internal combustion engine having a circular crank case 10 on which are radially mounted a plurality of cylinders 11 in which the pistons 12 are adapted to operate. The pistons 12 are pivoted to the connecting rods 13 by the wrist pins 14, the other ends of the connecting rods being pivoted to the rotary bearing 15. The pistons are driven by the ordinary means commonly used, including a carbureter, intake and exhaust valves and an ignition circuit which it is not deemed necessary to show herein for the purpose of understanding this invention.

The rotary bearing is mounted so as to rotate on the crank arm 16 integral with the crank shaft 17 on the end of which is mounted a fly wheel 18, said crank shaft being supported by the bearing 19 in the crank case 10. The bearing 19 is provided with peripheral teeth 20 adapted to be engaged by and mesh with an intermediate gear 21. The intermediate gear 21 in turn meshes with a gear 22 which is keyed to a pin 23 loosely mounted in the crank arm 16 so as to extend longitudinally therethrough. Rigidly mounted on one end of the pin 23 there is a key 24 adapted to engage the bearing 15 and lock it with said pin.

By means of this construction the bearing 15 will be rotated by the action of the gears 21 and 22 driven by their rotary movement about the gear teeth 20 on the stationary bearing 19, whereby the bearing 15 during its rotary movement will be stabilized and maintain a constant relation to the fixed bearing 19 thereby obtaining the desired result. In this manner the pivot pins 25 which connect the connecting rods 13 to the bearing 15 will operate about a center thereby keeping the pistons in alinement and eliminating any vibration or friction due to the unfixed motion or movement of the rotary bearing.

The invention claimed is:

1. In an engine of the type described, the combination with a plurality of cylinders, pistons and piston rods, a crank shaft, a hollow crank arm on the crank shaft and a bearing mounted on said crank arm and to which the inner ends of the piston rods are pivoted, of a fixed bearing around said crank shaft having gear teeth thereon, a rod extending through said hollow crank arm, a gear fixed to said rod, means to fixedly secure the rod to said bearing, and an intermediate gear carried by the crank arm and meshing with said gear teeth on the bearing and the gear on said rod, said gears maintaining a constant angular position of said bearing during the revolutions thereof.

2. In an engine of the type described the combination with a plurality of cylinders, pistons and piston rods, a crank shaft and a bearing rotatably mounted on said crank shaft and to which the inner ends of the piston rods are pivoted, of a fixed gearing, a second gear, a shaft rotatably mounted in parts of the crank shaft to which said second gear is attached, means to secure said shaft to said bearing, whereby they will rotate in unison, and an intermediate gear in mesh with the fixed gear and the second gear and revoluble with the second gear, said gears maintaining a constant angular position of said bearing during the revolutions thereof.

3. The combination in an internal combustion engine with concentrically disposed cylinders, a crank case on which said cylinders are mounted, pistons in said cylinders, means for driving said pistons, connecting rods pivoted to said pistons, and a crank shaft, of a rotary bearing mounted on said crank shaft to which said connecting rods are pivoted, a stationary gear rigidly mounted on said crank case, an intermediate gear adapted to mesh with said rigid gear, a second gear adapted to mesh with said intermediate gear, a shaft on which said last mentioned gear is keyed adapted to extend through the center of said crank shaft, and a key secured to the end of said shaft adapted to engage and lock said bearing thereto whereby the radii between the pivot points of said connecting rods and the center of said bearing will be retained in a parallel plane with their respective cylinders during the rotary movement of said bearing.

In witness whereof, I have hereunto affixed my signature.

FRANK WOOD.